United States Patent
Neeser et al.

(10) Patent No.: US 6,782,339 B2
(45) Date of Patent: Aug. 24, 2004

(54) DIFFERENTIAL PRESSURE GAUGE FOR CRYOGENIC FLUIDS WHICH SELECTS A DENSITY VALUE BASED ON PRESSURE MEASUREMENT

(75) Inventors: Timothy Neeser, Savage, MN (US); Christopher Jon Schmoeckel, Stillwater, MN (US)

(73) Assignee: Chart Industries, Inc., New Prague, MN (US)

( * ) Notice: Subject to any disclaimer, the term of this patent is extended or adjusted under 35 U.S.C. 154(b) by 257 days.

(21) Appl. No.: 09/923,636

(22) Filed: Aug. 7, 2001

(65) Prior Publication Data

US 2002/0065627 A1 May 30, 2002

Related U.S. Application Data

(63) Continuation-in-part of application No. 09/628,621, filed on Jul. 31, 2000, now Pat. No. 6,542,848.

(51) Int. Cl.$^7$ .............................................. G01B 13/20
(52) U.S. Cl. .................................................... 702/156
(58) Field of Search ...................... 702/156, 51; 706/14; 356/507; 374/43; 73/61.44, 861; 62/7, 45.1, 50, 53, 78, 47.45; 141/1; 123/575; 47/1; 428/34.1; 435/1.3

(56) References Cited

U.S. PATENT DOCUMENTS

| | | | |
|---|---|---|---|
| 3,221,551 A | 12/1965 | Hogan et al. | |
| 3,371,534 A | 3/1968 | Akeley | |
| 3,699,696 A | * 10/1972 | Rhoton | 62/45.1 |
| RE31,023 E | * 9/1982 | Hall, III | 47/1 |
| 4,852,054 A | * 7/1989 | Mastandrea | 702/51 |
| 5,259,673 A | * 11/1993 | Christopher | 374/43 |
| 5,309,764 A | 5/1994 | Waldrop et al. | |
| 5,453,944 A | * 9/1995 | Baumoel | 703/2 |
| 5,698,791 A | * 12/1997 | Lemaire | 73/861.04 |
| 6,234,030 B1 | * 5/2001 | Butler | 73/861.04 |
| 6,282,953 B1 | 9/2001 | Benjey | |
| 6,345,214 B1 | 2/2002 | Dulphy-Vigor et al. | |

FOREIGN PATENT DOCUMENTS

| | | |
|---|---|---|
| EP | 0890782 A1 | 1/1999 |
| FR | 1481242 | 5/1967 |
| FR | 2554230 A1 | 5/1985 |
| FR | 2811752 A1 | 1/2002 |
| GB | 723541 | 2/1955 |
| JP | 08233630 | 9/1996 |
| JP | 2001317983 | 11/2001 |

OTHER PUBLICATIONS

T. Bager, J casas and L Metral, Cryogenic pressure calibration facility using a cold force reference, Dec. 1, 1999.*

* cited by examiner

Primary Examiner—John Barlow
Assistant Examiner—Tung Lau
(74) Attorney, Agent, or Firm—Piper Rudnick LLP

(57) ABSTRACT

A differential pressure gauge for a cryogenic storage tank provides onboard entry, by an operator, of tank dimensions, tank orientation stratification coefficient, and the type of liquid stored within the tank. A differential pressure sensor supplies a signal corresponding to a differential pressure. A pressure sensor supplies a signal corresponding to the head pressure. The gauge uses the information supplied by an operator, combined with stored formulas and liquid characteristics, to perform real-time liquid volume computations. The liquid volume may be displayed on the gauge itself or may be transmitted via telemetry to an external device.

12 Claims, 12 Drawing Sheets

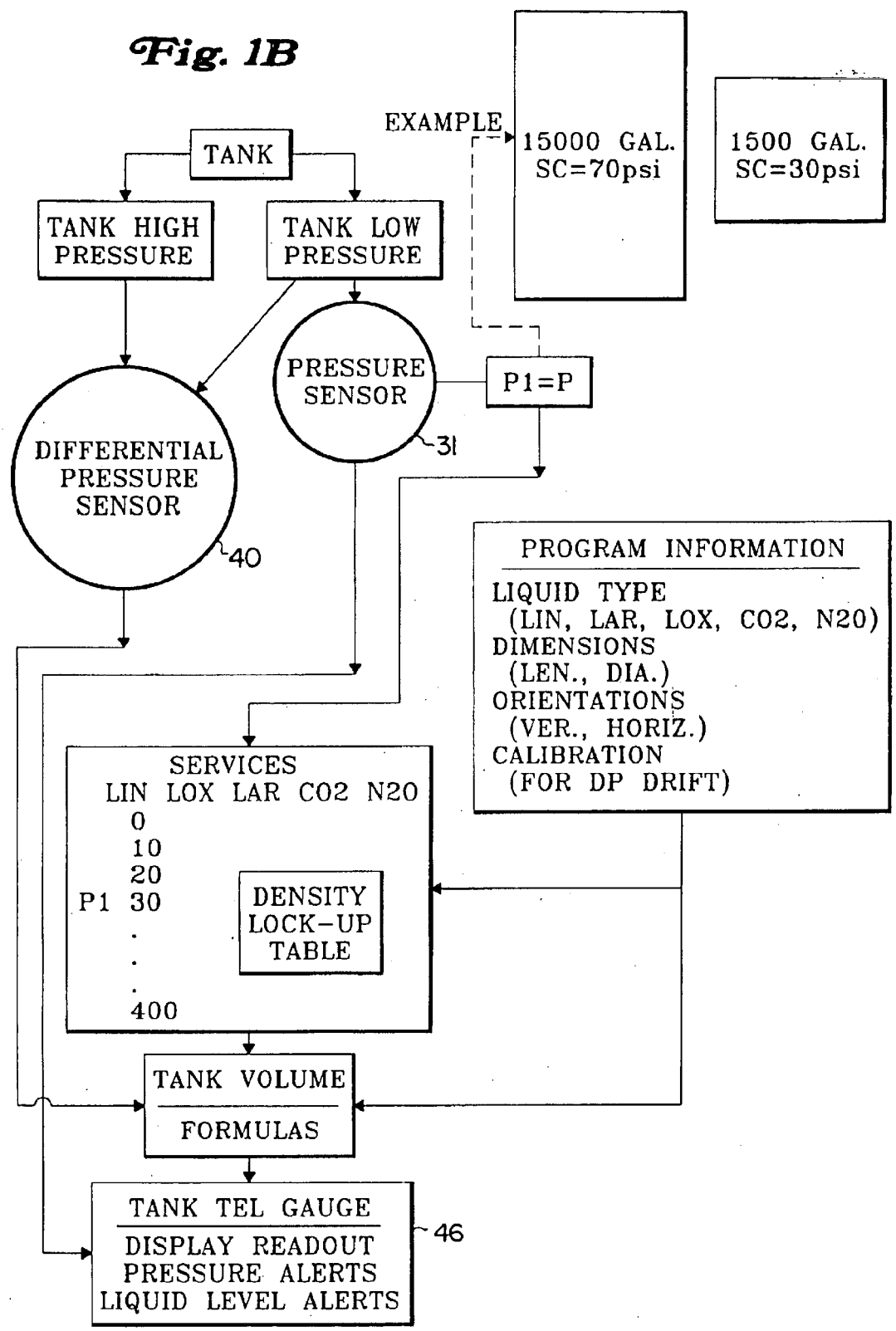

Fig. 1C

| VESSEL | STRATIFICATION CONSTANT |
|---|---|
| VS-525 | 5 |
| VS-900 | 5 |
| VS-1500 | 10 |
| VS-3000 | 10 |
| VS-6000 | 15 |
| VS-9000 | 15 |
| VS-11000 | 20 |
| VS-13000 | 30 |
| VS-13000 | 40 |

PRESSURE=P INPUT−STRATIFICATION CONSTANT

PRESSURE: SATURATION PRESSURE USED FOR DENSITY CALCULATIONS

P INPUT: TANK PRESSURE AS TAKEN FROM PRESSURE SENSOR

STRATIFICATION CONSTANT: CORRECTION FACTOR, DETERMINED BY TANK HEIGHT, TO CORRECT SATURATION PRESSURE FOR STRATIFICATION IN TANK

Fig. 1D

| NITROGEN | ARGON | OXYGEN | CO2 | NITROUS OXIDE (FT-3/LT) | P1 PRESS. (psig.) |
|---|---|---|---|---|---|
| 24.51139 | 29.73338 | 30.34281 | | 24.5688 | 0 |
| 23.84533 | 29.05061 | 29.64243 | | 23.86245 | 10 |
| 23.34054 | 28.53307 | 29.11597 | | 23.34036 | 20 |
| 22.92151 | 28.1036 | 28.68201 | | 23.06396 | 30 |
| 22.55656 | 27.73047 | 28.30646 | | 22.80292 | 40 |
| 22.22913 | 27.39659 | 27.9714 | | 22.48045 | 50 |
| 21.92899 | 27.09208 | 27.66618 | | 22.23476 | 60 |
| 21.65028 | 26.80975 | 27.38398 | | 21.86623 | 70 |
| 21.38815 | 26.54586 | 27.12011 | 22.30283 | 21.58983 | 80 |
| 21.13965 | 26.29665 | 26.87116 | 22.12479 | 21.40557 | 90 |
| 20.90187 | 26.06006 | 26.63458 | 21.95725 | 21.25201 | 100 |
| 20.67384 | 25.83373 | 26.40907 | 21.79865 | 21.06775 | 110 |
| 20.45312 | 25.61626 | 26.19209 | 21.64807 | 20.91419 | 120 |
| 20.23922 | 25.40665 | 25.98322 | 21.50367 | 20.79135 | 130 |
| 20.03068 | 25.20387 | 25.78073 | 21.36512 | 20.69921 | 140 |
| 19.82652 | 25.00689 | 25.58421 | 21.23183 | 20.60708 | 150 |
| 19.62675 | 24.81503 | 25.39324 | 21.10285 | 20.48424 | 160 |
| 19.4299 | 24.62795 | 25.20695 | 20.97789 | 20.33068 | 170 |
| 19.23549 | 24.44462 | 25.02451 | 20.85662 | 20.20784 | 180 |
| 19.04303 | 24.26506 | 24.84589 | 20.73844 | 20.11571 | 190 |
| 18.85203 | 24.0889 | 24.67026 | 20.62335 | 20.02357 | 200 |
| 18.66249 | 23.91548 | 24.49805 | 20.51073 | 19.96215 | 210 |
| 18.47344 | 23.74444 | 24.32796 | 20.40057 | 19.90073 | 220 |
| 18.28488 | 23.5758 | 24.16043 | 20.29258 | 19.8086 | 230 |
| 18.09583 | 23.40886 | 23.99503 | 20.18674 | 19.68575 | 240 |
| 17.90629 | 23.24363 | 23.83134 | 20.08245 | 19.59362 | 250 |
| 17.71577 | 23.0801 | 23.66935 | 19.98001 | 19.47077 | 260 |
| 17.52331 | 22.9176 | 23.50864 | 19.87942 | 19.34793 | 270 |
| 17.32939 | 22.75647 | 23.34921 | 19.77976 | 19.2558 | 280 |
| 17.13303 | 22.59602 | 23.19106 | 19.68164 | 19.13295 | 290 |
| 16.93374 | 22.43625 | 23.03334 | 19.58475 | 19.01011 | 300 |
| 16.73105 | 22.27682 | 22.87689 | 19.4891 | 18.91798 | 310 |
| 16.52446 | 22.11774 | 22.72045 | 19.39437 | 18.79513 | 320 |
| 16.31348 | 21.95899 | 22.56485 | 19.30057 | 18.67229 | 330 |
| 16.09714 | 21.7999 | 22.40926 | 19.20769 | 18.54944 | 340 |
| 15.87447 | 21.64082 | 22.25409 | 19.11574 | 18.4266 | 350 |
| 15.64498 | 21.48105 | 22.09893 | 19.02441 | 18.33447 | 360 |
| 15.40769 | 21.32094 | 21.94333 | 18.93369 | 18.21162 | 370 |
| 15.16114 | 21.16015 | 21.78774 | 18.84359 | 18.08878 | 380 |
| 14.90388 | 20.99833 | 21.63129 | 18.75411 | 17.99665 | 390 |
| 14.63394 | 20.83549 | 21.47442 | 18.66525 | 17.8738 | 400 |
| 14.3489 | 20.67128 | 21.31712 | 18.57669 | 17.78167 | 410 |
| 14.04389 | 20.50537 | 21.15897 | 18.48875 | 17.65883 | 420 |
| 13.71402 | 20.33809 | 20.99954 | 18.40112 | 17.53598 | 430 |
| 13.34908 | 20.16876 | 20.83883 | 18.3138 | 17.44385 | 440 |
| 12.93102 | 19.99704 | 20.67685 | 18.22648 | 17.33329 | 450 |

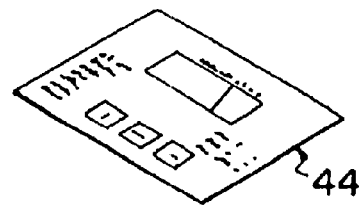
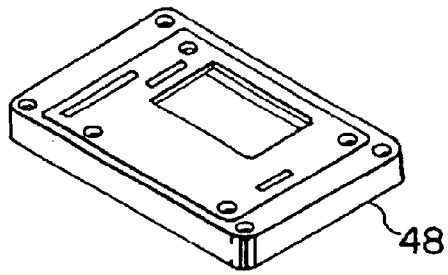
Fig. 2
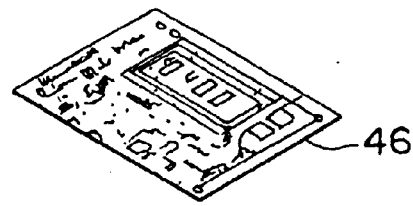
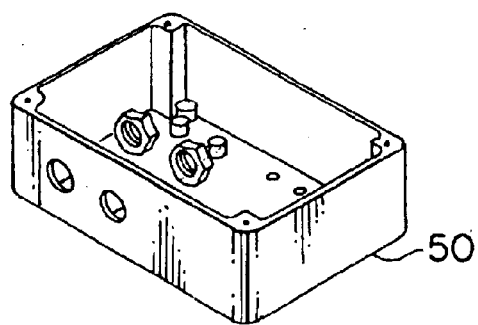
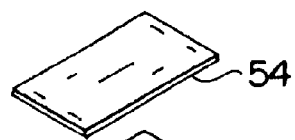
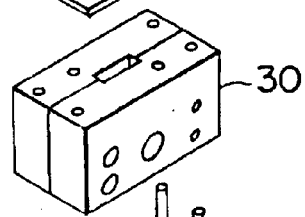
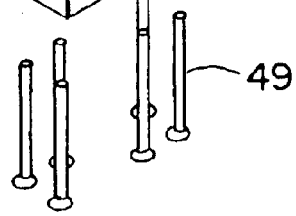

DIFFERENTIAL PRESSURE GAUGE FOR CRYOGENIC FLUIDS WHICH SELECTS A DENSITY VALUE BASED ON PRESSURE MEASUREMENT

RELATED APPLICATION

This application is a continuation-in-part of commonly assigned U.S. patent application Ser. No. 09/628,621 entitled DIFFERENTIAL PRESSURE GAUGE FOR CRYOGENIC FLUIDS filed Jul. 31, 2000 now U.S. Pat. No. 6,542,848.

TECHNICAL FIELD

The invention relates generally to the storage of cryogenic fluids and, more specifically, to an improved differential pressure gauge that performs real-time calculations of liquid volumes so that the gauge is easier to use and can be configured to various models of cryogenic containers.

BACKGROUND OF THE INVENTION

Cryogenic liquids, such as nitrogen, argon, nitrous oxide, oxygen, carbon dioxide, hydrogen, and the like, liquify at extremely cold temperatures. Unique problems are encountered in handling and storing cryogenic liquids because the liquids undergo density changes at various storage pressures. A cryogenic storage system contains an insulated tank for containing a cryogenic liquid in a liquid space. Even though the tank is insulated, heat will enter the tank, causing the liquid cryogen to slowly vaporize to a gas and, as a result, causing the volume of liquid in the tank to diminish. This vaporization creates a pressurized head space in an upper portion of the tank.

Differential pressure gauges and sensors are well known in the art for aiding in monitoring the volumes of liquids. A differential pressure sensor senses the difference between a pressure at the head space of the tank, or head pressure, and a pressure at the liquid space of the tank, or liquid pressure, also known as column pressure. The liquid pressure is affected by both the pressure created by the head space of the tank and the pressure due to the weight of the liquid in the liquid space above the liquid space measuring point. By measuring the pressure difference between the pressure at the liquid space and the pressure at the head space, the differential pressure sensor senses the pressure solely attributable to the weight of the liquid. Typically, this pressure is measured either in pounds per square inch (psi), or in inches of water column.

By dividing the sensed differential pressure by the density of the liquid, the height of the liquid above the liquid space measuring point may be calculated. This liquid height can then be displayed on the gauge. Determining the volume of the liquid in the container is more difficult, however. Once the differential pressure has been measured, an operator must turn to a calibration chart, separate from the gauge, to determine the liquid volume. Calibration charts are also required in order to determine a total liquid weight, or an equivalent gas volume (typically measured in standard cubic feet). The relation between the differential pressure measured by the sensor and the liquid volume of the tank is affected by the tank shape, dimensions, and orientation, as well as the liquid density. Each calibration chart is therefore uniquely designed for a particular cryogenic tank model, tank orientation, type of cryogenic liquid and expected pressure of the liquid. The liquid density is a function of the liquid type and the state of its pressure. In order to determine a liquid volume level, the operator must procure an appropriate chart and use the differential pressure reading with the chart. Such calibration charts are awkward to use, and separate charts are required for different combinations of the factors listed above. This prevents efficient on-site monitoring of the liquid volume.

There is a need in the art for a method of determining, in real-time, a liquid volume using an on-site differential pressure gauge.

There is a further need in the art for a differential pressure gauge that does not require the use of calibration charts in order to determine a liquid volume.

SUMMARY OF THE INVENTION

These needs and others are met by an improved differential pressure gauge, which allows real-time calculations of liquid volumes based upon the reading of a differential pressure sensor, an absolute pressure sensor, and upon initial, one-time inputs by an operator. These inputs do not require the use of a calibration chart. The gauge can be configured to work with most cryogenic storage tanks. The gauge receives data from a differential pressure sensor, which senses the pressure difference between the head space and the liquid space of a cryogenic storage tank. The gauge includes a keypad, a micro-controller, and a data display for level and pressure. The gauge further receives data from a pressure sensor, which senses the pressure in the head space.

In operation, a user initially inputs programming information into the gauge, such as the dimensions of the tank, the orientation of the tank, the desired units of display, type of liquid, stratification constant and any zeroing out calibration values (not to be confused with an entry based upon a calibration chart). Once the user has input the necessary programming information, the input data is stored, preferably in a nonvolatile memory such as an EEPROM, and it is not necessary to input the information again. Only if the information needs to be changed (as would be required by replacing the tank or the type of liquified gas) is further user action required. The gauge contains stored information such as cylinder dimensional formulas, unit conversion formulas, and properties (such as liquid density) of the liquified gas specified by the user. The formulas and properties are stored in memory contained on the onboard computer.

To determine a liquid volume present at a particular instant, the differential pressure sensor sends an analog signal, corresponding to a differential pressure, to the onboard computer contained within the gauge. The analog signal is converted to a digital signal. The gauge analyzes this digital signal along with the initial input information from the user, and a signal from a pressure sensor using stored formulas and properties to calculate a liquid volume. The results are displayed on the device, or may be transmitted via telemetry to a remote device of the user's choosing. Because a visit by a human operator to a site is now not needed just to ascertain liquid volume, site visits by supply trucks can be minimized and can be automatically triggered by the gauge detecting that a tank's liquid volume has fallen below a predetermined level.

The following detailed description of embodiments of the invention, taken in conjunction with the appended claims and accompanying drawings, wherein like characters represent like parts, provide a more complete understanding of the nature and scope of the invention.

BRIEF DESCRIPTION OF THE DRAWINGS

FIG. 1B is a block diagram of the cryogenic storage vessel of FIG. 1 fitted with the differential pressure gauge of the present invention;

FIG. 1C is a sample table containing conversion coefficients used to calculate an average pressure;

FIG. 1D is a sample table containing liquid densities corresponding to various combinations of liquid type and pressure ranges;

FIG. 2 is an exploded view of a differential pressure gauge and sensor according to the present invention;

DETAILED DESCRIPTION OF THE INVENTION

Figure 1A:
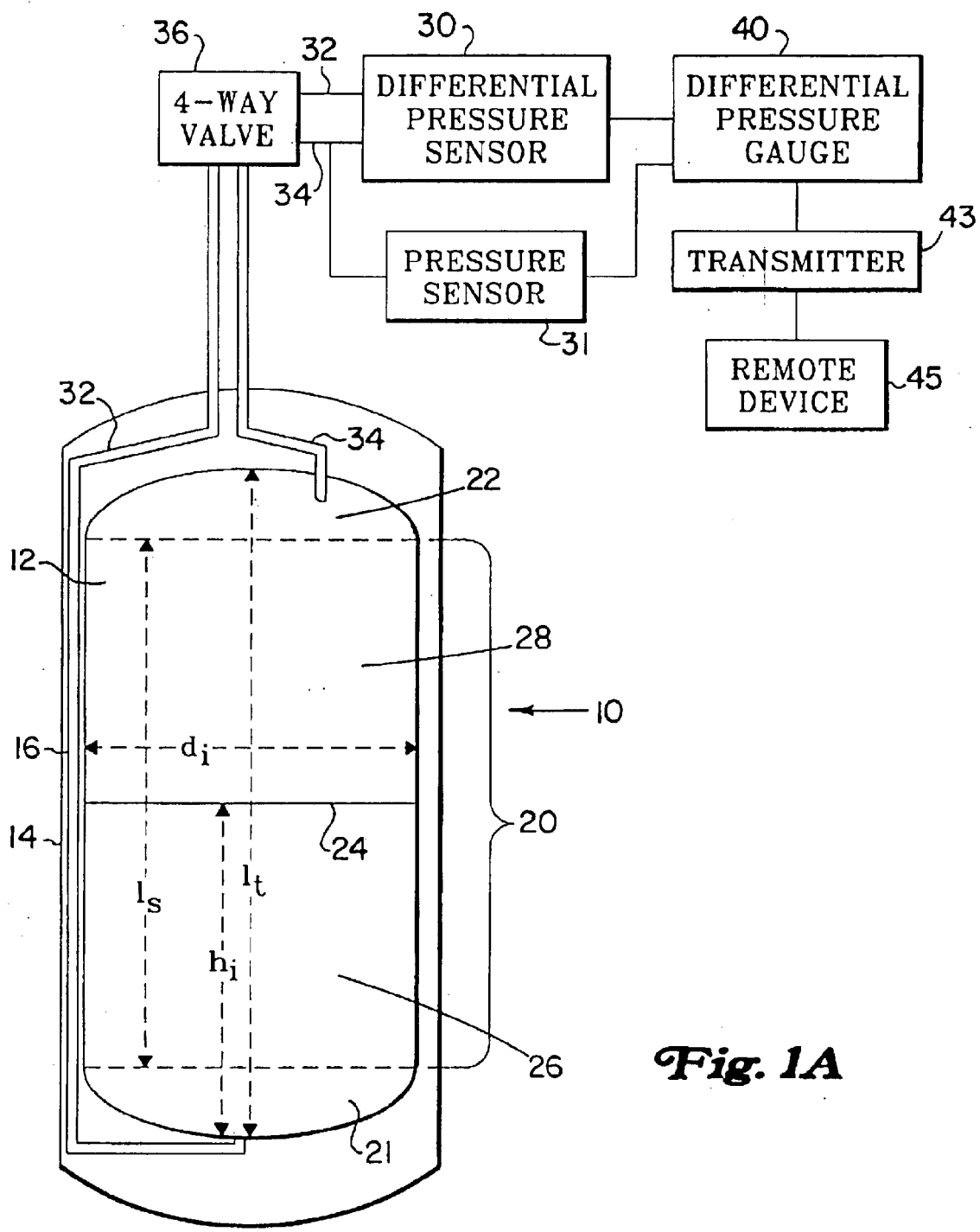
FIG. 1A is an elevational view of a typical cryogenic storage vessel fitted with the differential pressure gauge of the present invention.

FIG. 1 shows a cryogenic storage vessel fitted with the differential pressure gauge of the present invention, the vessel being indicated generally at 10. Vessel 10 contains an inner tank 12 for holding cryogenic liquid. The tank 12 comprises a shell portion 20 and bottom and top convex end portions 21, 22. The top of the liquid level is shown at 24, and the height of the inner liquid is indicated by $h_i$. The tank has overall tank length $l_t$ and inner diameter $d_i$. An outer jacket 14 surrounds inner tank 12, forming an insulation chamber 16 between the jacket 14 and tank 12. The insulation chamber 16 is filled with an insulation material (not shown), and a vacuum is created within chamber 16 to minimize the heat transfer between the external environment and the interior of the tank 12.

As heat from outside of the vessel 10 transfers into the tank, a portion of the liquid at the bottom of the container will vaporize and move to the top of the container, separating the contents of the tank into a liquid space 26, and a head space 28. The head space pressure can be significant as pressure builds within tank 12. The pressure at the bottom of the liquid space includes both the pressure of the head space 28 and the weight of the liquid in the liquid space 26. Tap lines 32,34 provide communication between both the liquid space and the head space and a differential pressure sensor 30, via 4-way valve 36. The tap lines are preferably tubing formed of copper or other metal. Tap lines 32, 34 are fed into two connections 312, 314 (shown in FIG. 3) of the differential pressure sensor 30 and fitted to the sensor 30, preferably using elbow brass fittings. The differential pressure sensor 30 is in turn connected to a differential pressure gauge 40 (see FIG. 2) for calculating, displaying, and transmitting information about the differential pressure and liquid volume of the cryogenic fluid within the cylinder 20. The information may also be transmitted to a personal computer (not shown) via any suitable means, including but not limited to modem, infrared, LAN, IR, serial port, USB, and wireless means.

FIG. 2 is an exploded view of the differential pressure gauge 40 and differential pressure sensor 30 of the present invention. Differential pressure gauge 40 includes an operator input interface in the form of a membrane keypad 44, shown in more detail in FIG. 9, for configuring the gauge. The keypad 44 is electrically connected to an onboard computer 46, containing a processor such as a microcontroller or a microprocessor, the keypad being physically separated from the onboard computer by a cover 48. An onboard computer 46 used in a preferred embodiment of the invention is model number MC68HC711E20CFN2 manufactured by Motorola, Inc. of Schaumburg, Ill. The onboard computer is adapted to calculate the liquid volume. The onboard computer 46 and cover 48 are housed within enclosure 50, which is waterproof.

Figure 3:
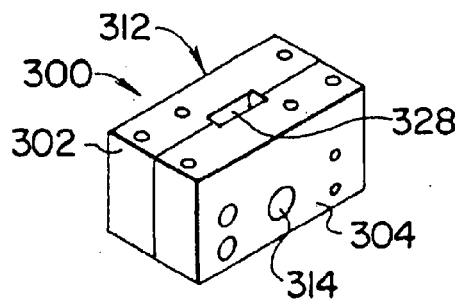
FIG. 3 is a bottom perspective view of a differential pressure sensor according to the present invention.
Figure 4:
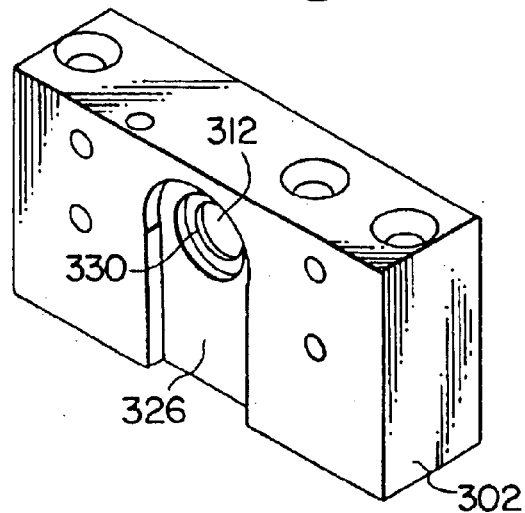
FIG. 4 is a top perspective view of an inside face of a differential pressure sensor housing portion.
Figure 5:
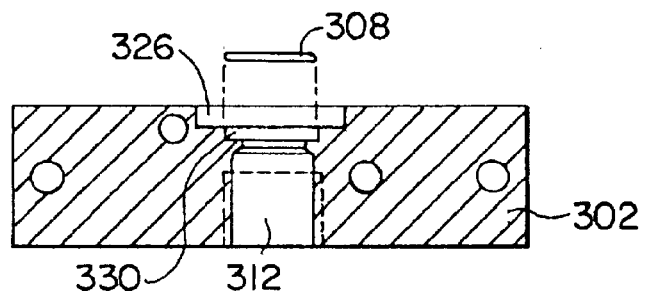
FIG. 5 is a cross-sectional view of a differential pressure sensor housing portion.
Figure 6:
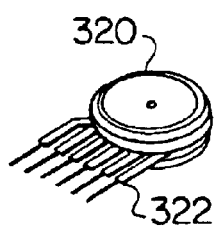
FIG. 6 is a differential pressure chip, in an embodiment of the present invention.

Sensor 30 is connected to differential pressure gauge 40 by set screws 49, and preferably separated from the gauge by a gasket 54. The sensor 30 in a preferred embodiment includes a housing 300, preferably of brass, for containing a differential pressure sensor chip 320. FIGS. 3–5 show sensor 30 in more detail. To manufacture the sensor 30, the plastic-enclosed chip 320 is placed between first and second housing portions 302, 304 (FIG. 3). Housing portion 302, an inside surface of which is shown in perspective in FIG. 4, and shown in cross-section in FIG. 5, is tap drilled so that a first surface of chip 320 (containing a passageway to the central transducer) is exposed through a tap connection 312 extending from the inside surface through the first housing portion 302 to the outside surface. One such chip 320 is shown in FIG. 6. A differential pressure sensor chip in a preferred embodiment is a plastic-enclosed Motorola MPX5050 series piezoresistive transducer, manufactured by Motorola, Inc. of Schaumburg, Ill. Alternative sensors may be used providing that the disclosed functionality is implemented. The brass housing 300 allows the plastic-enclosed chip to be used for the present invention, by helping the chip withstand the large absolute pressures that are transferred to the chip.

A second housing portion 304, being manufactured similarly to portion 302, is mated to first housing portion 302 over chip 320 so that opposing surfaces of the chip are exposed through tap connections 312 through both housing portions 302, 304. In this way, tap lines 32 and 34 (FIG. 1) communicate with each side, respectively, of the chip 320 within its plastic enclosure.

A pair of O-rings 308 (FIG. 5) between opposing surfaces of the chip 320 and the inside surface of housing portions 302, 304 ensure a tight fitting of the chip 320, sealing the chip within the housing 300. Each O-ring 308 is disposed within an annular groove 330 for maintaining the position of the O-rings 308 within the housing portions. The annular grooves 330 extend inwardly from channels 326 (shown in FIG. 4) toward the outside face of each housing portion. The grooves are concentric with and surround the inside face of tap connections 312, as shown in FIG. 5. The two housing portions are bolted together around the chip 320 and O-rings 308 until the halves bottom out. The housing portions, when assembled may be separated by a rubber gasket (not shown) having a central opening. The assembled housing portions exert significant pressure on the O-rings 308, and thus onto the outside of the chip 320, pre-loading the chip. The pre-loading pressure is created by an approximately 30% (±3%) compression of O-rings 308 against both sides of chip 320. By securing the plastic-enclosed sensor chip 320 within the brass housing 300, the forces applied to the outside of the chip hold the plastic-enclosed chip together against the significant absolute pressures exposed to both surfaces of the chip via tap lines 32, 34 (FIG. 1). A gas-tight seal is thus formed about the chip even at high pressure. The housing strengthens the chip, thus preventing the chip, and case, from exploding under the significant absolute pressure introduced. The plastic-enclosed chip has a maximum operating absolute pressure of 100 psi, but when encased in the brass housing, it has a maximum operating absolute pressure of at least 750 psi. The cost of this preferred differential pressure sensor is significantly lower than prior sensors, because an off-the-shelf chip, with low absolute pressure tolerance, is adapted to withstand large absolute pressures while measuring differential pressure. This is much more cost-effective than manufacturing a customized diaphragm within a housing.

Channel 326 extends inwardly from the inside face of each housing portion. The channel contains a circular segment surrounding the inside face of tap connection 312 and adapted to contain chip 320 when combined with the other block. Channel 326 has a longitudinal segment extending from the circular segment along the inside surface of the housing portion towards an outer edge of the housing portion. When facing channels 326 from housing portions 302, 304 are combined (as the housing is assembled) they form a passageway 328 for housing the chip, and for electrical leads 322 running from the transducer of the sensor chip 320 to the differential pressure gauge 40.

Turning to FIGS. 1A and 1B, (gauge) pressure sensor 31 is provided for measuring the head space pressure within tank 12. Tap line 34 provides communication between the head space and pressure sensor 31, via valve 36. Tap line 34 is preferably tubing formed of copper or other metal. The pressure sensor 31 is in turn connected to the onboard computer 46.

The onboard computer 46 reads a conversion coefficient SC from lookup table 84 (FIGS. 1B, 1C, 7) according to the shape and orientation of the cylinder 20. Next, the onboard computer 46 calculates an estimated average pressure (P1) by subtracting the predetermined conversion coefficient (SC) from the head pressure (P) read from the pressure sensor 31. In turn, the density of the cryogenic fluid is read from a lookup table 84 (FIGS. 1B, 1D and 7), using the adjusted pressure P1 and the liquid type.

Preferably, the lookup table 84 is stored in memory 85, which is a nonvolatile memory such as a ROM, EEPROM or the like.

The conversion coefficient SC is empirically determined, and varies depending on the size and orientation of the cylinder 20.

Figure 7:
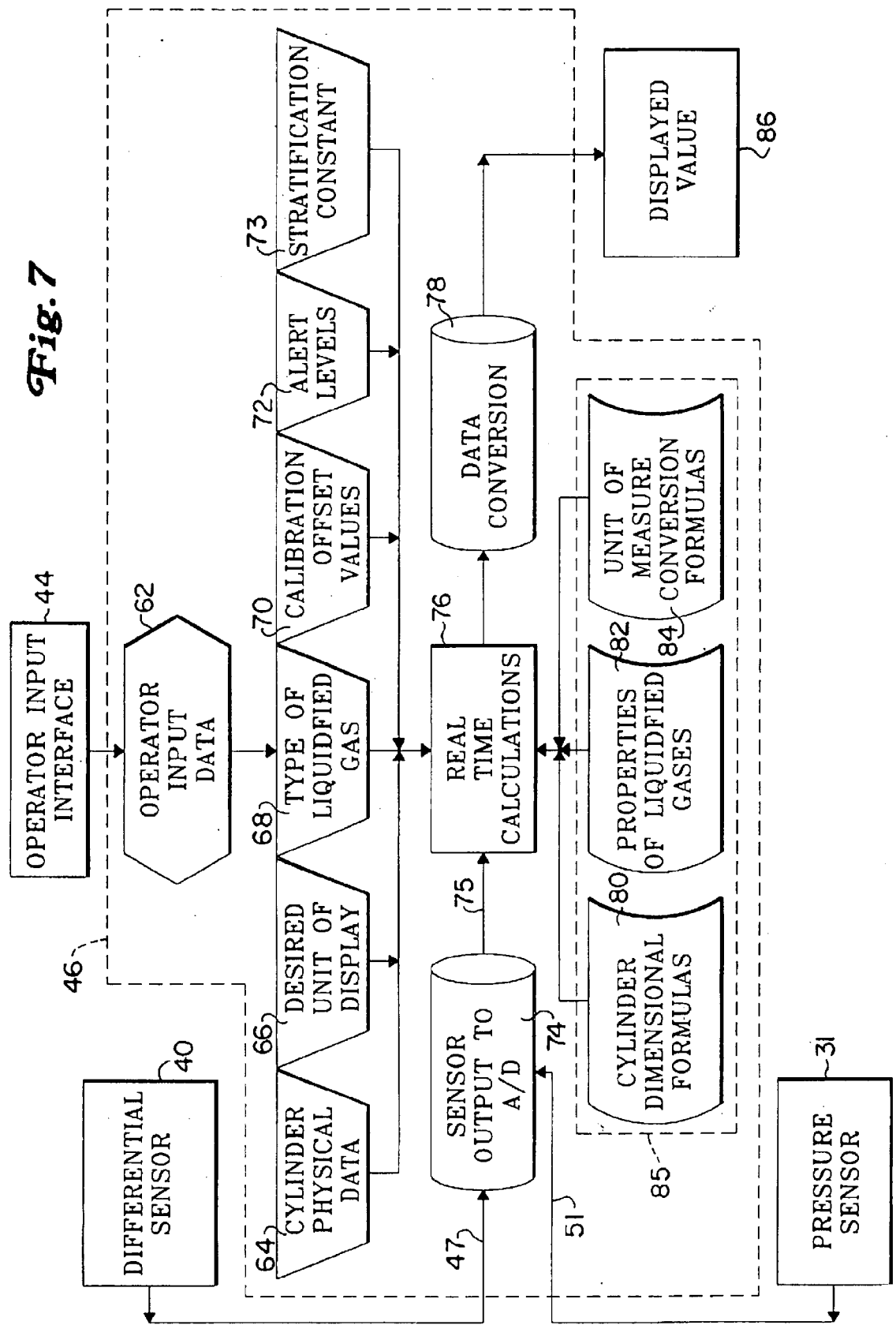
FIG. 7 is a block diagram for liquid volume calculations for the differential pressure gauge of the present invention.

FIG. 7 is a block diagram of the operation of liquid volume determination for the sensor and gauge of the present invention. This diagram shows the inputs and outputs of the differential pressure gauge when calculating a liquid volume. The onboard computer 46 receives initial operator input data 62 via an operator input interface, such as keypad 44. This input data may include physical data 64 for the container, including the container's diameter and height, and the aforementioned stratification coefficient SC 73. The desired unit of display 66, type of liquified gas 68, calibration offset values 70, and alert levels 72 are similarly input by the operator and received by the onboard computer 46 where they are stored, preferably in EEPROM. Once this input data is entered into the gauge by a user, the user does not need to reenter the information. Only if the user wishes to change the configuration input parameter (units, for example), does the user need to enter additional information. The gauge applies the input data to determine liquid volumes, without further input required from the user.

Dimensional formulas for the container 80, liquefied gas constants 82 such as density, and unit of measure conversion formulas 84 are stored in memory 85, such as a programmable ROM or EEPROM, for use in calculating the liquid volume in the selected unit. In alternative embodiments, certain elements of the operator input data, such as cylinder physical data 64 and desired unit of display 66, could be calibrated at the factory and stored in memory 85 (such as a PROM or EEPROM) so that the operator of the unit would not need to enter them in the field.

In operation, differential pressure sensor 30 sends an analog signal, dependent upon the detected differential pressure, on path 47 (corresponding to leads 322 (in FIG. 6)) to an analog-to-digital converter 74, which in turn sends a digital signal on path 75 to the microprocessor 76 for processing. Similarly, pressure sensor 31 sends an analog signal, dependent on the head pressure detected on path 51 to an analog-to-digital converter 74, which in turn sends a digital signal on path 75 to the microprocessor 76 for processing. In calculating liquid volumes, the microprocessor periodically interprets the digital signal on path 75 to determine the differential pressure. From this signal, the liquid volume is calculated in real-time, in a preferred embodiment, as follows.

The digital signal received by the gauge from path 75 is represented by a raw value of counts. With the preferred sensor chip used (3.0 V DC), the counts are related to differential pressure by a ratio of 255 counts per 3 psi. Alternative ratios are possible, particularly if different sensors are used. By dividing the raw value of counts by this stored ratio, a differential pressure is calculated.

Similarly a signal is received from the pressure sensor. This signal corresponds to the pressure in the tank and calculates saturation pressure using the SC constant. The gauge then retrieves from table 84 (FIG. 10) one of a set of density constants to calculate liquid height $h_i$.

To reduce the number of entries in the look-up table 84, the pressure value P1 may be rounded, for example to the nearest 10 PSI value.

The differential pressure is divided by the liquid density to obtain a liquid height $h_i$, in inches. The tank length $l_t$ and diameter d, input by the user, and the liquid height $h_i$, are then used to calculate the liquid volume, for either vertical or horizontal tanks, according to the respective formulas given below.

For vertical tanks, the gauge first calculates the length of shell 20, shown as $l_s$ in FIG. 1, by assuming that the bottom and top convex ends 21, 22 are 2:1 oblately ellipsoidal shapes and that each have a height equal to (d/4), therefore $$l_s = l_t - 2*(d/4).$$

The gross (total) filled tank volume $V_{tank}$ is calculated using:

$$V_{tank} = 0.93((\pi/4)d^2(l_s) + \pi(d^3/12))$$

with constant π stored in memory to ten significant digits, and constant 0.93 used to adjust for normal fill level of the tank.

Then, the volume of liquid $V_1$, in cubic inches, is calculated using one of four formulas, depending on whether the liquid level 24 is within bottom end 21, shell 20, top end 22, or fills the tank, respectively.

If $h_l<d/4$:

$$V_1=h_l^2(\pi d-(4/3)\pi h_l)$$

If $h_l<l_s+d/4$:

$$V_1=(\pi/24)d^3+((\pi/4)d^2(h_l-d/4))$$

If $h_l<l_s+d/2$:

$$V_1=(\pi/24)d^3+(\pi/4)d^2l_s+(\pi/4d^2(h_l-l_s-d/4)-(4/3)\pi(h_l-l_s-d/4)^3)$$

else $$V_1=V_{tank}$$

Figure 8:
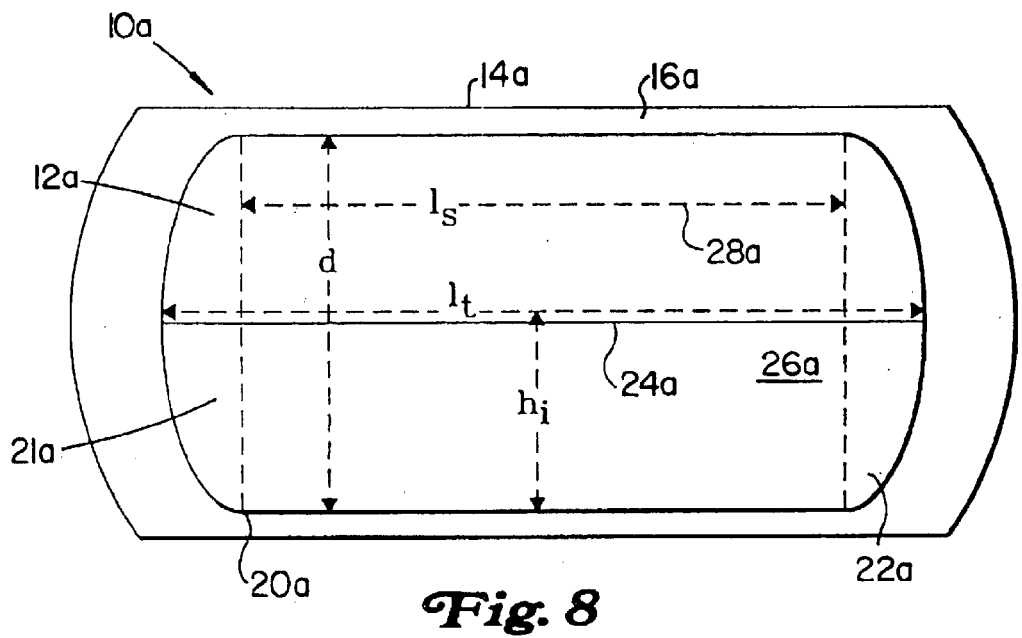
FIG. 8 is an elevational view of a horizontally-oriented cryogenic storage vessel.

Alternatively, liquid volume calculations may be performed for horizontally-oriented vessels, such as vessel 10a, shown in FIG. 8. The vessel contains horizontally-oriented tank 12a, outer jacket 14a, insulation chamber 16a, and an interior volume divided between liquid space 26a, and head space 28a. Tank 12a is composed of shell 20a and left and right convex end portions 21a, 22a. The liquid level is shown at 24a. For this tank, having liquid height $h_l$, inner tank diameter d, and tank length $l_l$, the volume is calculated by adding the liquid volume in the left and right ends 21a, 22a, each assumed to have a length of (d/4), to the liquid volume in shell 20a. The liquid volume $V_1$, in cubic inches, is thus calculated using:

$$V_1=h_l^2((\pi/4)d-(\pi/6)h_l)+((\sqrt{h_l}(d-h_l)(h-d/2)+(d^2/4)*\sin^{-1}((2/d)(h_l-d/2)))*l_s$$

where $l_s=l_l-2*(d/4)$

These volume calculation formulas are exemplary only. It should be apparent to those skilled in the art that alternative formulas may be programmed and contained within the memory of the differential pressure gauge for performing volume calculations. Alternatively, the computer 46 may be preprogrammed with lookup tables which, given the height, will return approximately the same results as the above algebraic formulas. In yet another embodiment, these tables may be produced via calculation after initial input and the results stored within memory, with the runtime operation then limited to a fast table lookup.

By dividing $V_1$ by $V_{tank}$ and multiplying by 100%, a fill percentage can be calculated. This fill percentage may be adjusted according to an entered calibration value. The fill percentage is rounded to the nearest 5% for display.

As opposed to the prior art, the liquid volume calculations can be performed in real-time, without the user resorting to calibration charts that depend upon particular cylinder models, cylinder orientations, and liquid types. The user, after initial programming, is not required to input or analyze data before receiving a liquid volume result, and is not required to monitor the gauge. As shown in FIG. 7, the calculated liquid volumes are converted to display values at 78 and are displayed at 86 on the gauge.

The results may also be transmitted via telemetry for remote or automated monitoring of liquid volume. In a preferred embodiment, gauge 40 is coupled to a phone transmitter 43 (FIG. 1) for transmitting tank status information, such as liquid level, liquid volume, equivalent gas volume, pressure, or fill percentage, to remote devices 45. The phone transmitter 43 also may send an alert to an operator if the liquid volume within tank 12 falls below a particular level. The telemetry system may also schedule delivery of additional liquid cryogen, as needed. Phone transmitter 43 is coupled to a phone line, or other signal transmitting line. In addition to, or alternative to the phone transmitter 43, gauge 40 may be coupled to a satellite transmitter or a cellular transmitter (not shown).

The gauge 40 may be preprogrammed to send a signal to phone transmitter 43 indicating that an alarm has been tripped. When transmitter 43 receives this signal, it relays the information on the state of the tank (such as the liquid volume) to a remote device 45, such as a PC, via the telephone line. Of course, alternative means of transmission are possible. The remote device then signals that an alarm has been received and needs attention. For example, an audible alarm may be used. The remote device may be programmed to automatically notify a driver of a liquid cryogen delivery vehicle of the alarm and corresponding liquid volume, via pager, email, or other methods.

In normal (non-alert) operation, within these remote devices, the calculation results, as well as raw differential pressure sensor readings, may be stored for aggregation, reporting, graphing, or other purposes. By use of these telemetry features, an operator, after a one-time input of tank parameters into the gauge 40, can remotely monitor the storage container 10 only when desired, with the gauge itself managing the amount of liquid within the inner tank 12. Also, fewer visits by a delivery vehicle are needed, because the gauge may be programmed to notify the vehicles for resupply only if the tank 12 volume is below a desired amount.

Figure 9A:
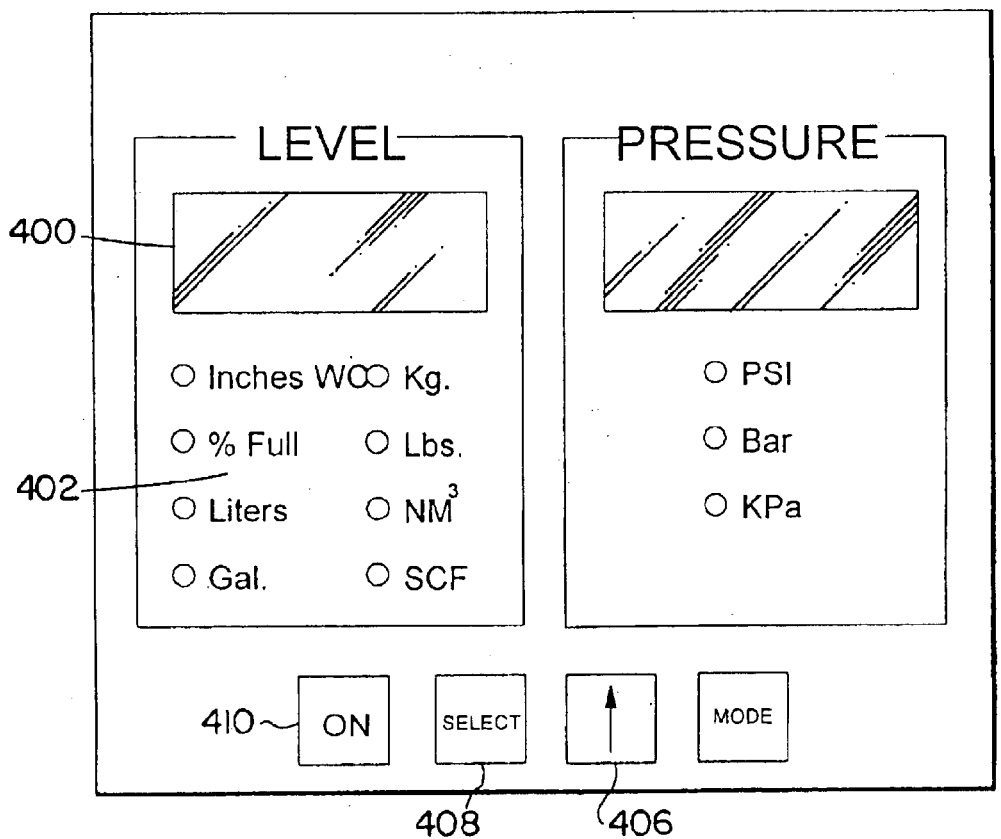
FIG. 9A is an illustration of a keypad for an embodiment of the differential pressure gauge of the present invention.
Figure 9B:
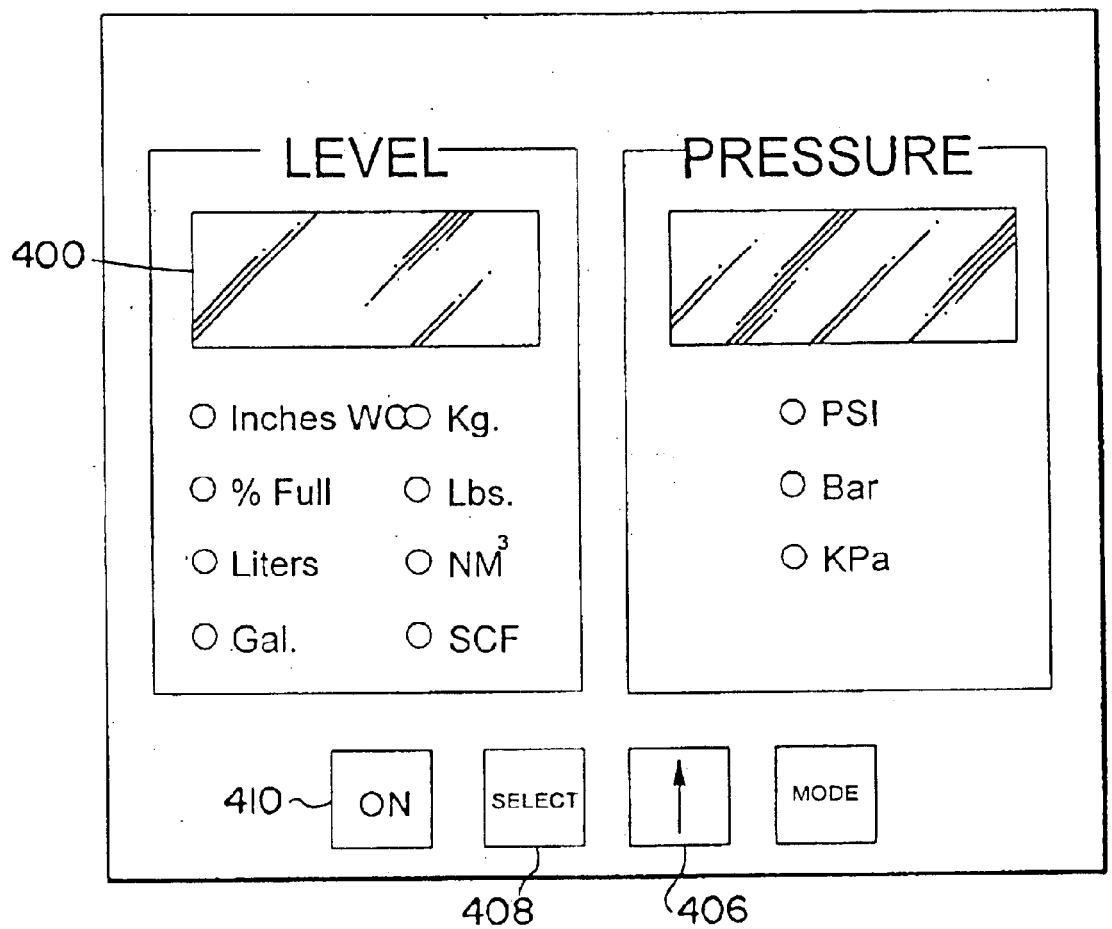
FIG. 9B is an alternate view of the keypad shown in FIG. 9.

Before the differential gauge can calculate liquid volumes, an operator must initially input data parameters. These parameters may be entered by an operator, using display keypad 44, or via telemetry, as described above. FIG. 9A shows an embodiment of a keypad for the differential pressure gauge of the present invention. An alternate view of the keypad is shown in FIG. 9B. A clear display portion 400 allows numerical LED's contained on computer 46 to be visible to the operator. Other LED's visible on the keypad indicate settings and alerts. The LED's corresponding to the units chosen by the operator are shown at 402. The alert LED's are shown at 404. Three keys 406, 408, 410, shown at the bottom of the sample display, allow the user to configure the gauge. When programming the gauge, the increment key 406 either increases the displayed reading by an increment that depends on the unit being programmed, or it scrolls through a list of options within a field. The select key 408 allows the user to accept a displayed result when programming the gauge, and may also move the gauge to a next set of parameters. To enter a number, for example, '345', an operator pushes the select key 408 until the hundreds digit is blinking on the display. The operator scrolls through the digits in the hundreds position by pushing the increment key 406 until a '3' is reached. The operator then pushes the select key 408, causing the tens digit to blink. The operator similarly increments to and selects '4' in the tens position, and then '5' in the ones position. After pressing the select key 408 at this final position, the chosen value or code is stored in EEPROM so that it does not need to be reentered as the gauge calculates liquid volumes. The "ON" key 410 allows an operator to start the gauge. Holding the "ON" key for a period of time puts the gauge in diagnostic mode.

Figure 10A:
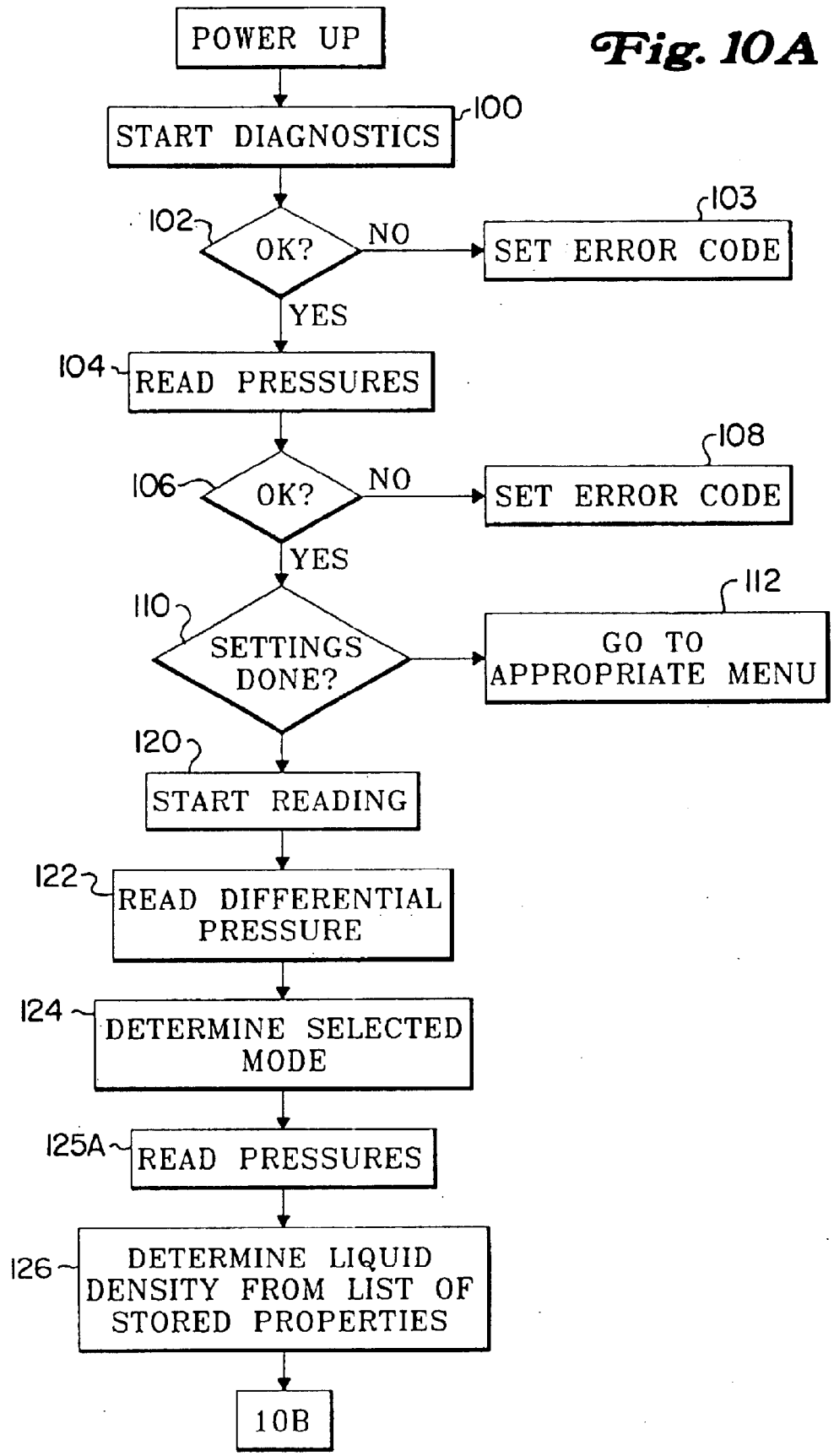
FIGS. 10A–10B are a flow chart showing a process for operation of the differential pressure gauge.
Figure 10B:
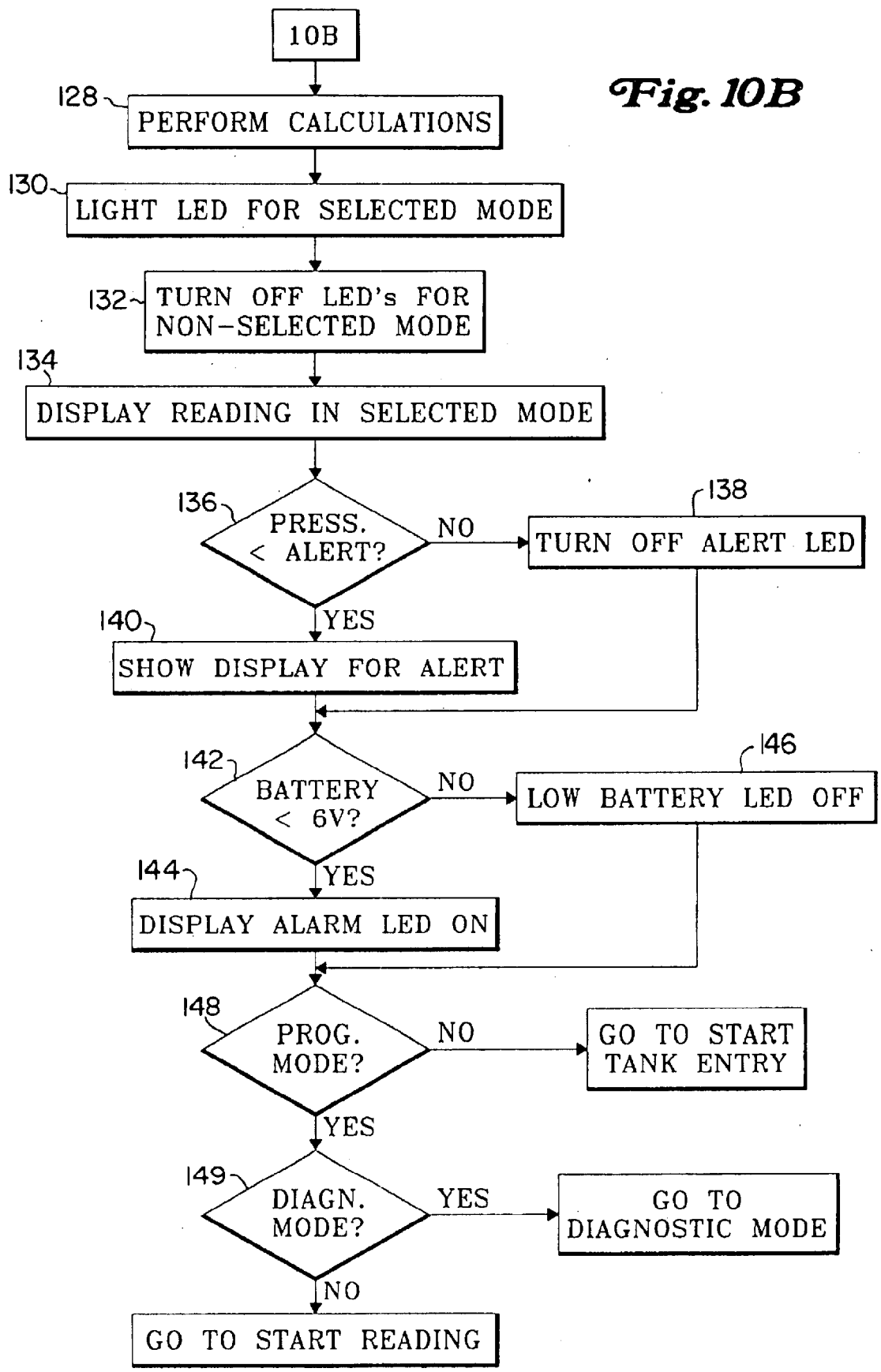
Figure 11:
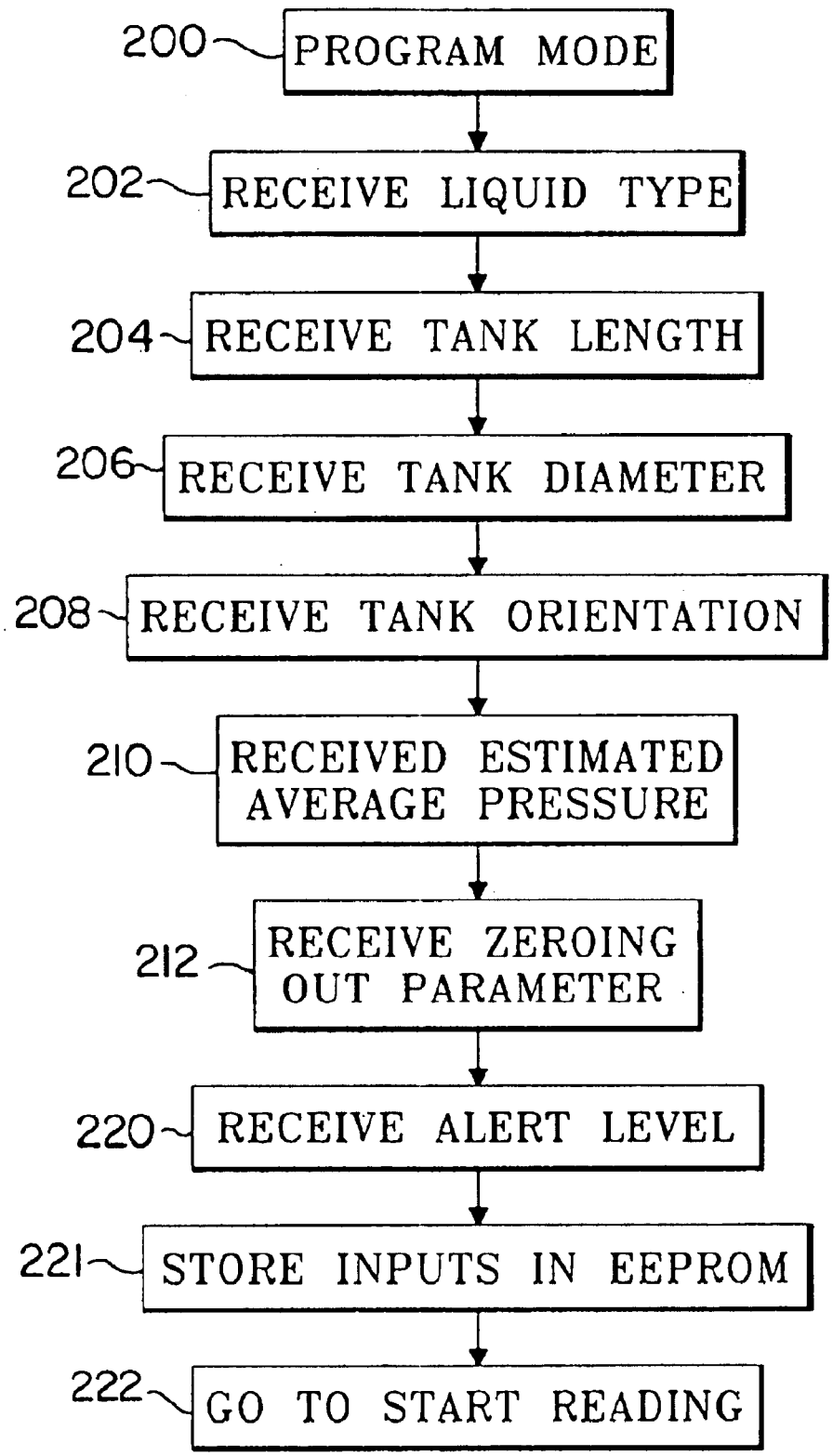
FIG. 11 is a flow chart showing a process for inputting parameters for the differential pressure gauge.

FIGS. 10A–10B show a flow chart of a process for operation of the gauge of the present invention. After powering up, the gauge performs appropriate diagnostics at 100, checking gauge functions such as, but not exclusively, the functions of the microprocessor, EEPROM, alert switches, serial ports, or the included software. A check of the power-up at 102 follows. If one or more of the gauge functions are faulty, an appropriate error code may be set at 103. If the diagnostics are successful, the gauge reads the differential pressure at 104. The gauge performs a second diagnostic check at 106 based at least partly upon the differential pressure read. If the diagnostic fails for reasons such as an inappropriate pressure range, a faulty alert output, or an inappropriate calibration status, an error code is set at 108. If the settings are okay at 110, the gauge will begin taking pressure readings and calculating liquid volumes at 120. If not, the gauge goes to an appropriate menu at 112.

When taking readings at 120, the gauge reads a differential pressure at 122, and determines the display mode at 124 (FIG. 10A) that a user selected based upon previous inputs. These modes include, but are not limited to: percent full (% full), liters, pounds, kilograms, psi, inches of water column (pressure), inches (height), standard cubic feet, or normal cubic meters.

The computer reads the pressure at 125A. The computer acquires, at 126, the necessary formulas, dimensions and liquid properties, and performs the appropriate calculations or their equivalents at 128 as described above, though, again, many of these calculations could be reduced to lookup tables stored within EEPROM prior to runtime.

In one embodiment, the gauge performs a volume calculation in a standard unit (such as cubic inches) and then, based upon the selected unit of display, converts the volume to the desired unit, using stored unit conversion formulas and/or constants, shown at 84. If a liquid height or differential pressure is chosen, the gauge makes the appropriate calculations described above, for these units as well. The LED corresponding to the selected mode is lighted at 130. LED's corresponding to the modes not selected are turned off at 132. The related readout is displayed at 134. For percent full, for example, a sample reading could be "50%." In a preferred embodiment, the displayed fill percentage is a multiple of 5%, but this percentage may be in any increment. If the pressure sensed by the differential pressure sensor is less than a minimum amount desired at 136, as set by an operator, the gauge can indicate this by, for example, an alert message will be shown on display 400. Otherwise, the alert LED is turned off at 138. More than one alert level may be programmed into the device and analyzed. If the battery voltage is below a particular desired level at 142, an alert message may be shown on display 400 (FIG. 10C). Otherwise, the LED is turned off 146. The gauge determines if the user wishes to go to parameter input mode at 148, or diagnostic mode at 149. The user indicates this by holding one key or a combination of keys for a particular period of time. If the user does not indicate an alternate mode, the gauge again begins to take readings 120 (FIG. 10A). As long as the gauge is powered and not interrupted by the user, the gauge will continue to take periodic readings and display the results, without further input required from the user.

By pressing and holding the select and increment keys for a certain period of time, the operator can begin a parameter input mode at 200, shown in FIG. 1. Before accepting new inputs, the gauge may clear the parameters stored in the EEPROM. The operator, by scrolling with the increment key and selecting with the select key, enters parameters, starting with the liquid type at 202. The liquid type may include liquid nitrogen, argon, nitrous oxide, oxygen, carbon dioxide, or others. The operator enters a tank length at 204, and a tank diameter at 206. The tank length and diameter may be configured by a similar system of selecting and incrementing digits as described in the alarm settings. The tank orientation is entered by the user at 208. The increment key is used to rotate the tank orientation between a vertical orientation and a horizontal orientation.

Also in parameter input mode 200, it is desired that an operator enter a desired stratification coefficient. This entry accommodates for variations in the liquid stratification as the height of the liquid increases. The gauge uses the exact liquid pressure for determining a proper liquid density in volume calculations by comparing the liquid pressure to a set of liquified gas properties, including liquid density values, stored in nonvolatile memory, as described above. The gauge may also accept a calibration, or zeroing out, parameter at 212. This parameter allows an operator to calibrate the "% Full" reading, which is the percentage of volume within the tank which is filled with liquid. In a preferred embodiment, the zeroing out parameter ranges from −9 to +9, in increments of one, with each increment representing a 3% calibration in the displayed fill percentage. At value "zero", there is no calibration. With this method, the operator may program the gauge without resorting to a chart to determine the proper inputs. The operator may then program one or more alert levels at 220, so that an alert will be indicated if the pressure or volume in the tank falls below a certain level. For example, by holding the increment key and select key, an operator can configure a first alert level. Once in the mode of configuring the first alert level, the user enters the alert level in hundreds, tens and ones, in the manner previously described. The programming may be a step in program mode, or alternatively, an operator may directly enter the alert setting mode at 220 by, for example, holding one or more keys for a particular length of time. Once the programming is complete, and the values are stored at 221, the gauge returns at 222 to reading mode (step 120, FIG. 10A) to take readings, perform real-time calculations, and display results.

While the preferred embodiments of the invention have been shown and described, it will be apparent to those skilled in the art that changes and modifications may be made therein without departing from the spirit of the invention, the scope of which is defined by the appended claims.

We claim:

1. A method of determining a volume of liquefied gas in a cryogenic storage tank having a liquid space and a head space, comprising the steps of:

entering and storing the dimensions and orientation of the storage tank;

entering and storing the type of liquefied gas contained in said tank;

entering and storing a stratification coefficient;

storing a lookup table of density constants, stored according to the estimated average pressure, and liquid type;

measuring the differential pressure between the liquid space and the head space;

measuring the pressure at the head space;

calculating an estimated average pressure using the measured head pressure and the stratification coefficient;

reading a liquid density value from the look-up table of density constants using the calculated estimated average pressure and the entered liquid type; and computing a liquid volume in said tank as a function of said differential pressure, liquid density, tank dimensions, tank orientation, and type of liquefied gas.

2. The method of claim 1, wherein the step of computing the liquid volume further comprises the step of displaying the liquid volume on a display.

3. The method of claim 1, wherein the step of storing the dimensions of the storage tank comprises the step of storing a tank height and diameter.

4. The method of claim 1, further comprising the steps of:
storing an alert volume; and
generating an alert signal if the calculated liquid volume is below the alert volume.

5. The method of claim 1 where the stratification coefficient is determined by tank height, orientation, operating pressure, refill level and refill frequency to correct saturation pressure for stratification in a tank.

6. A method of determining a volume of a cryogenic liquid in a tank having a liquid space and a head space, comprising the steps of:
storing a lookup table of conversion coefficients;
storing a lookup table of density constants;
measuring the differential pressure between the liquid space and the head space;
measuring the pressure at the head space;
calculating an estimated average pressure using the measured head space pressure and a conversion coefficient selected from the lookup table of conversion coefficients;
reading a liquid density value from the look-up table of density constants using the calculated estimated average pressure; and
computing a liquid volume in said tank as a function of said differential pressure and liquid density.

7. The method of claim 6, wherein the step of computing the liquid volume further comprises the step of displaying the liquid volume on a display.

8. The method of claim 6, further comprising the steps of:
storing an alert volume; and
generating an alert signal if the calculated liquid volume is below the alert volume.

9. The method of claim 6 where the conversion coefficients are stratification constants that are determined by tank height, orientation, operating pressure, refill level and refill frequency to correct saturation pressure for stratification in a tank.

10. A method of determining a volume of a cryogenic liquid in a tank having a liquid space and a head space, comprising the steps of:
entering and storing a stratification coefficient that accommodates for variations in liquid stratification as a height of the cryogenic liquid in the tank increases, orientation, operating pressure, refill level and refill frequency;
storing a lookup table of density constants;
measuring the differential pressure between the liquid space and the head space;
measuring the pressure at the head space;
calculating an estimated average pressure using the measured head space pressure and the stratification coefficient;
reading a liquid density value from the look-up table of density constants using the calculated estimated average pressure; and
computing a liquid volume in said tank as a function of said differential pressure and liquid density.

11. The method of claim 10, wherein the step of computing the liquid volume further comprises the step of displaying the liquid volume on a display.

12. The method of claim 10, further comprising the steps of:
storing an alert volume; and
generating an alert signal if the calculated liquid volume is below the alert volume.

\* \* \* \* \*